(12) United States Patent
Hsieh

(10) Patent No.: US 8,408,696 B2
(45) Date of Patent: Apr. 2, 2013

(54) VIEWING GLASSES WITH ADJUSTMENT MECHANISM

(75) Inventor: Hung-Yen Hsieh, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 190 days.

(21) Appl. No.: 13/037,413

(22) Filed: Mar. 1, 2011

(65) Prior Publication Data

US 2012/0140164 A1    Jun. 7, 2012

(30) Foreign Application Priority Data

Dec. 3, 2010  (TW) ................................ 99142206 A

(51) Int. Cl.
*G02C 5/12* (2006.01)
(52) U.S. Cl. ........................................ 351/137; 351/136

(58) Field of Classification Search .................. 351/124, 351/126, 128, 131, 132, 136, 137, 138, 47, 351/48, 57, 58
See application file for complete search history.

(56) References Cited

U.S. PATENT DOCUMENTS 4,405,214 A * 9/1983 Bolle ............................. 351/88
6,386,705 B1 * 5/2002 Chen ............................ 351/138

* cited by examiner

*Primary Examiner* — Hung Dang
(74) *Attorney, Agent, or Firm* — Altis Law Group, Inc.

(57) ABSTRACT

Viewing glasses include a frame and a bridge. The frame has a spacer, and the spacer has at least two location grooves formed in different positions. The bridge is arranged on the spacer and includes a base and two side pads. The base has an elastic location piece corresponding to the location grooves of the spacer that can adjust the position of the bridge located on the spacer.

9 Claims, 5 Drawing Sheets

VIEWING GLASSES WITH ADJUSTMENT MECHANISM

BACKGROUND

1. Technical Field

The disclosure relates to viewing glasses, and particularly to viewing glasses with adjustment mechanism.

2. Description of the Related Art 3D movies are gaining popularity, with viewing glasses often required for proper viewing. The viewing glasses can often be reused, and are commonly produced in a single size and are not adjustable being one size fits all due to the fixation of a bridge of the viewing glasses.

These one size fits all 3D viewing glasses can be uncomfortable for the user, thereby degrading the quality of viewing experience.

Therefore, it is desirable to provide viewing glasses which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present viewing glasses. Moreover, in the drawings, like reference numerals designate corresponding parts throughout the views.

DETAILED DESCRIPTION

Embodiments of viewing glasses with adjustment mechanism as disclosed are described in detail here with reference to the drawings.

Figure 1:
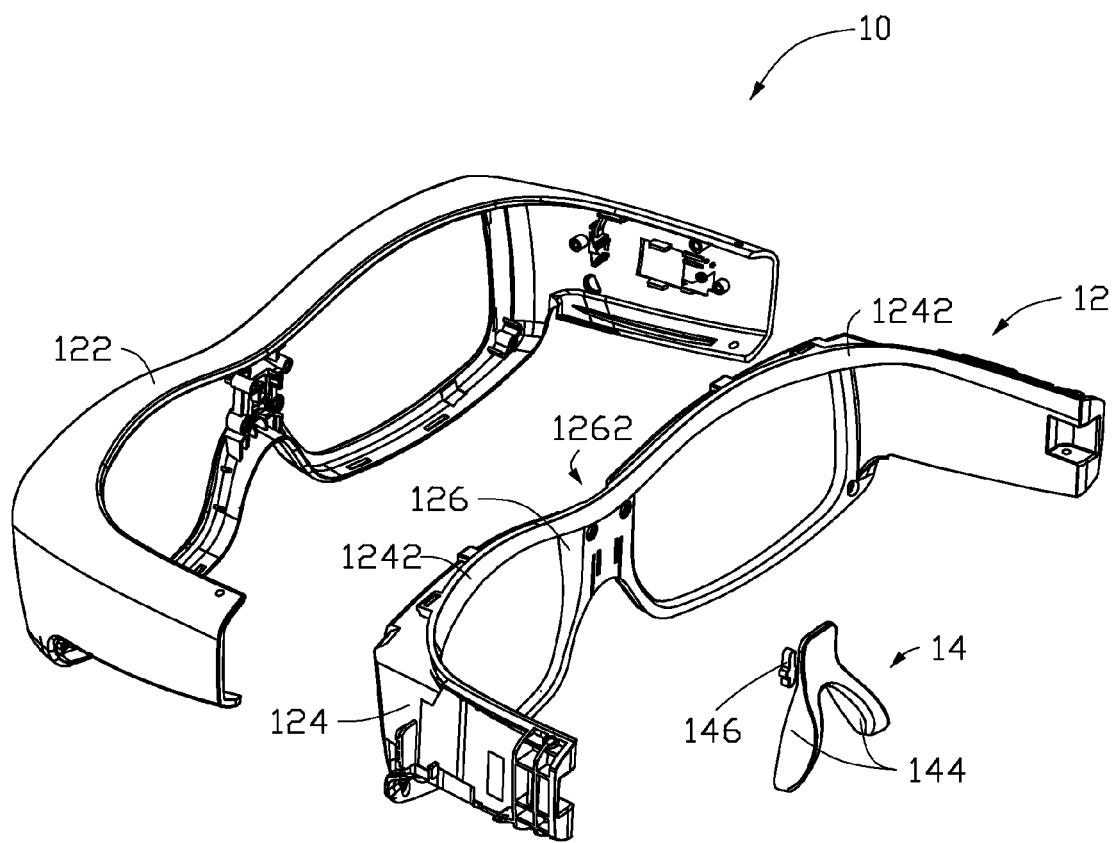
FIG. 1 is an exploded view of viewing glasses with adjustment mechanism in accordance with a first embodiment.

Referring to FIG. 1, viewing glasses with adjustment mechanism 10 in accordance with a first embodiment include a frame 12, and a bridge 14.

Figure 4:
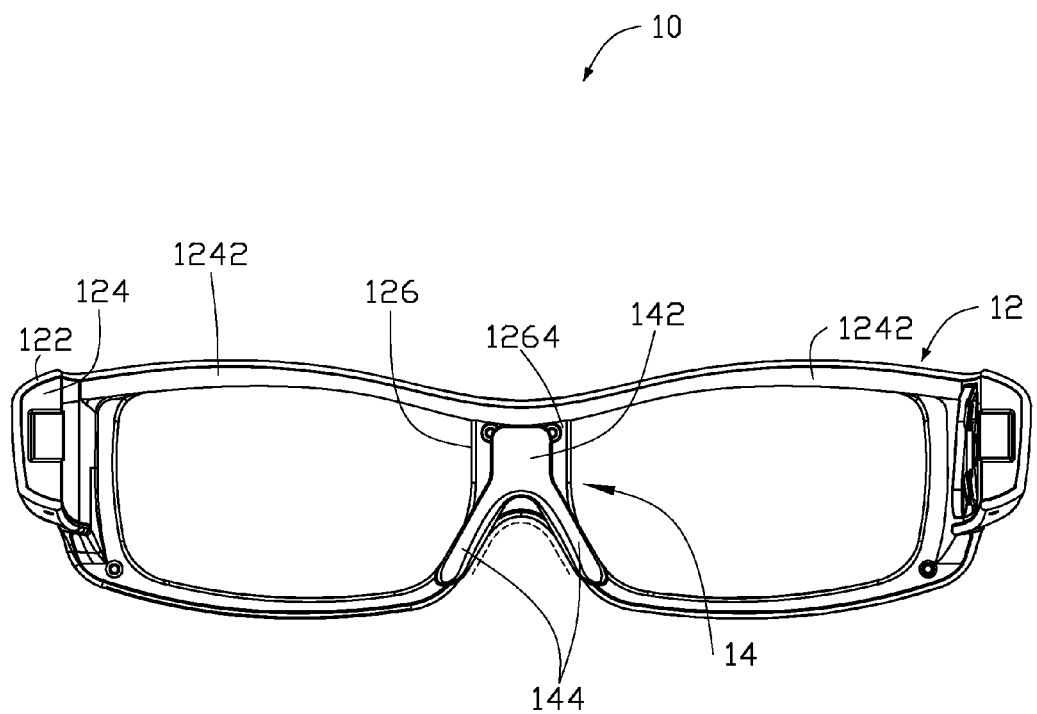
FIG. 4 is a rear view of the viewing glasses of FIG. 1.

The frame 12 includes a front cover 122 and a back cover 124 for arranging two lenses (not shown). A spacer 126 separates two lens brackets 1242 of the back cover 124 and fixes the bridge 14. The spacer 126 is a bar having an inner surface 1262 and an outer surface 1264, as shown in FIG. 4. The inner surface 1262 faces the front cover 122, and the outer surface 1264 faces the bridge 14.

Figure 2:
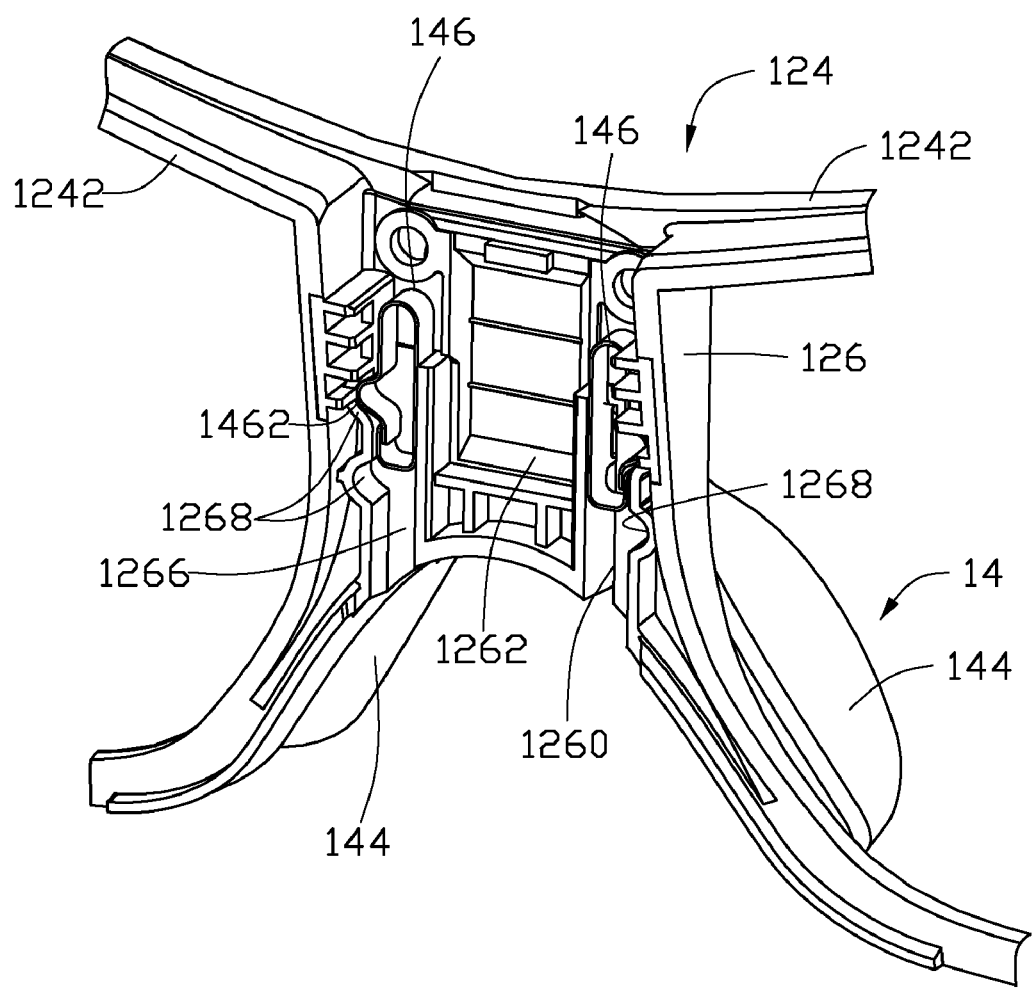
FIG. 2 is a schematic view of assembly of a spacer and a bridge of the viewing glasses of FIG. 1.
Figure 3:
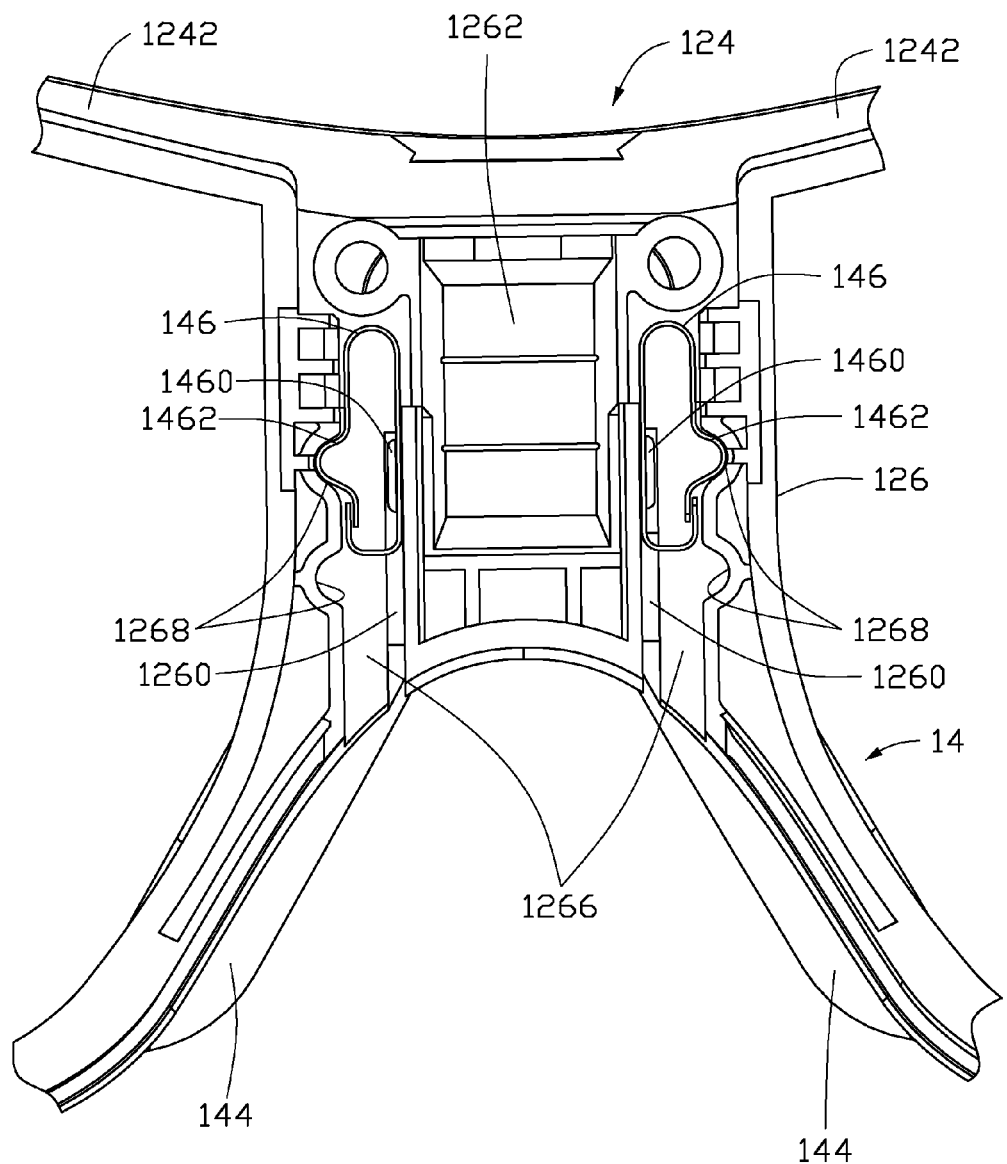
FIG. 3 is a front view of assembly of the spacer and the bridge of the viewing glasses of FIG. 2.

Referring to FIG. 2 and FIG. 3, the inner surface 1262 defines a channel 1266 with at least two location grooves 1268 arranged in two different positions of the channel 1266 and a connecting groove 1260 from a bottom of the spacer 126 passing through the inner surface 1262 and the outer surface 1264. A width of the connecting groove 1260 is less than that of the channel 1266.

The bridge 14 has a base 142 and two side pads 144. The two side pads 144 extend from a bottom of the base 142 to two sides of the base 142 for arrangement on the nose, positioning the lenses of the frame 12 corresponding to the eyes. The bridge 14 has an elastic location piece 146 arranged on a surface of the base 142 toward the frame 12. The elastic location piece 146 is fixed on the surface of the base 142 by a connecting piece 1460. A gap is defined by the elastic location piece 146 and the surface of the base 142 by the length of the connecting piece 1460. The width of the gap corresponds to the thickness of the board of the spacer 126.

The connecting piece 1460 is thinner than the connecting groove 1260 and thereby passes therethrough.

The bridge 14 passes through the gap between the elastic location piece 146 and the surface of the base 142, and the connecting piece 1460 passes through the connecting groove 1260. Thus, the bridge 14 is fixed on the board of the spacer 126. Accordingly, the elastic location piece 146 corresponds to the channel 1266 of the inner surface 1262 of the spacer 126. The elastic location piece 146 is received in the channel 1266. The elastic location piece 146 can slide inside the channel 1266.

The elastic location piece 146 has an elastic protrusion 1462 corresponding to the location groove 1268 of the channel 1266. The elastic protrusion 1462 is received in the location groove 1268. When the elastic protrusion 1462 and the location groove 1268 are fixed mutually, the elastic location piece 146 is tightly fixed inside a position of the channel 1266. Thus, the bridge 14 is tightly fixed on the spacer 126.

In this embodiment, the bridge 14 has two elastic location pieces 146 arranged thereon. The elastic location pieces 146 are T-shaped, and a base of the T-shaped has the elastic protrusion 1462. The two elastic protrusions 1462 are arranged back to back. The elastic location pieces 146 correspond to the channel 1266 of the inner surface 1262 of the spacer 126.

The two elastic protrusion 1462 correspond to the location grooves 1268 of the outer wall of the channel 1266. When the elastic location pieces 146 are received in the location grooves 1268, the bridge 14 is tightly fixed on the spacer 126.

The two location grooves 1268 are arranged from top to bottom of the channel 1266. Thus, the bridge 14 can be adjusted upwards or downwards of the spacer 126. Referring to FIG. 3, the elastic protrusions 1462 of the elastic location piece 146 correspond to the top location grooves 1268 of the channel 1266 and are fixed mutually. Thus, the bridge 14 is arranged on an upper position of the spacer 126 as shown in FIG. 4. The distance between the two side pads 144 of the bridge 144 and the two frames 144 is shortest, being substantially suitable for users having a big nose.

Figure 5:
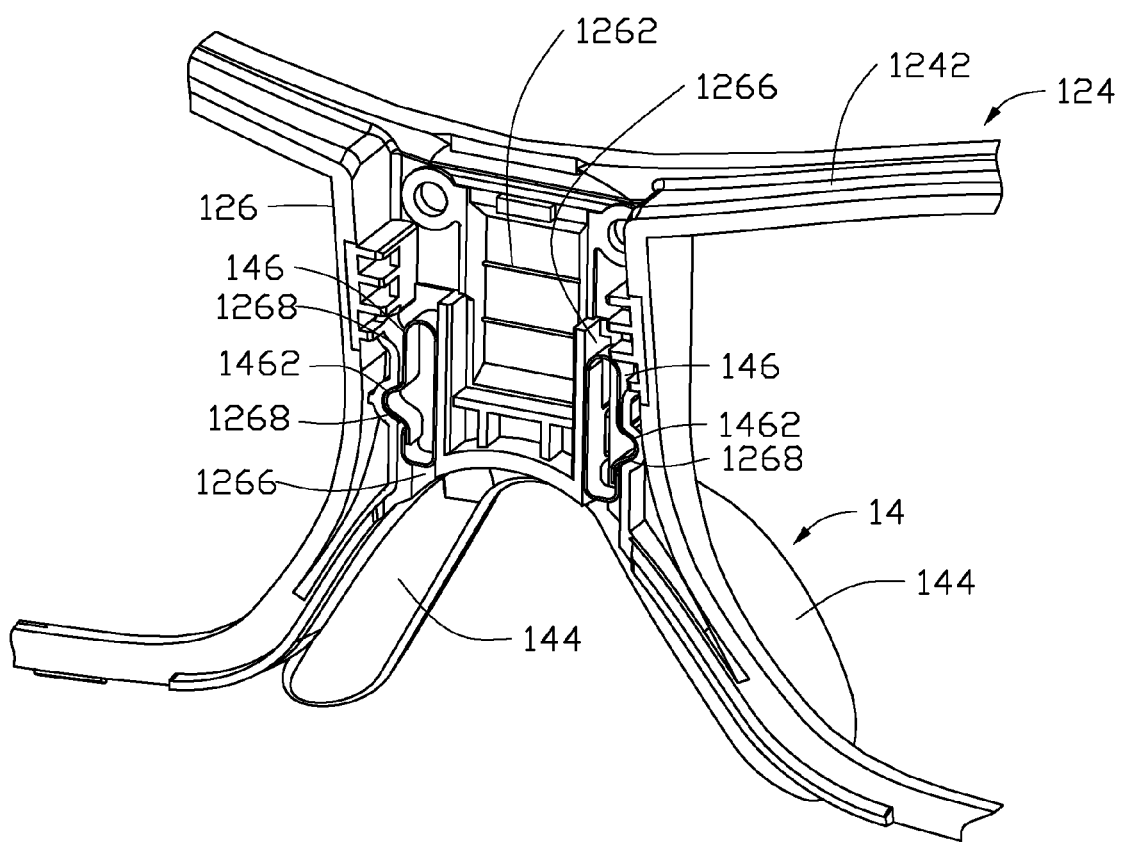
FIG. 5 is a schematic view of assembly of the spacer and the bridge of the viewing glasses of FIG. 2 after adjustment.

By applying force downward on the bridge 14, positioning thereof can be adjusted. The two elastic protrusions 1462 of the elastic location piece 146 are separated from the upper location grooves 1268, and the bridge 14 can slide downward. The elastic location piece 146 slides downward in the channel 1266. When the elastic location piece 146 slides downward to a lower location groove 1268 of the channel 1266, the elastic protrusion 1462 of the elastic location pieces 146 are tightly fixed into the lower location grooves 1268 of the channel 1266 by recovery elastic force as shown in FIG. 5. Thus, the bridge 14 is arranged on a lower position of the spacer 126 and the two side pads 144 of the bridge 14 move downwardly. The distance between the side pad 144 and the nose bracket 1242 substantially increases, suitable for a small nose.

The position of the bridge and side pads can be adjusted to the user's need, enhancing quality of the viewing experience.

While the disclosure has been described by way of example and in terms of exemplary embodiment, it is to be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. Viewing glasses, comprising:
   a frame having a spacer with at least two location grooves in different positions; and
   a bridge arranged on the spacer including two side pads, a base having an elastic location piece, wherein the elastic location piece corresponds to the different location grooves of the spacer;
   wherein the frame includes a front cover and a back cover, the back cover having two lens brackets, and the spacer is between the two lens brackets.

2. The viewing glasses of claim 1, wherein the spacer is a board including an inner surface and an outer surface, the inner surface faces the front cover, and the inner surface defines a channel.

3. The viewing glasses of claim 2, wherein the location grooves are defined from top to bottom in the channel, the elastic location pieces are received and slide in the channel.

4. The viewing glasses of claim 2, wherein the channel has a connecting groove defined from the bottom of the spacer upward through the inner and outer surfaces, and a width of the connecting groove is less than that of the channel.

5. The viewing glasses of claim 4, wherein the elastic location piece is fixed on a surface of the base toward the frame by a connecting piece, a gap is defined between the elastic location piece and the surface of the base by the connecting piece, and a width of the gap corresponds to a thickness of the board.

6. The viewing glasses of claim 5, wherein the connecting piece goes through the connecting groove of the spacer, the elastic location piece corresponds to the channel of the inner surface of the spacer, and the bridge is arranged on the spacer by the gap.

7. The viewing glasses of claim 6, wherein each elastic location piece has an elastic protrusion corresponding to the location groove.

8. The viewing glasses of claim 7, wherein the elastic location pieces are T-shaped, and a top of the T-shaped is the elastic protrusion.

9. The viewing glasses of claim 7, wherein the base has two elastic location pieces arranged parallelly, and the elastic protrusions are arranged back to back.

* * * * *